No. 699,447. Patented May 6, 1902.
M. CAMPBELL.
FRICTION CLUTCH.
(Application filed Dec. 16, 1901.)
(No Model.) 2 Sheets—Sheet 1.
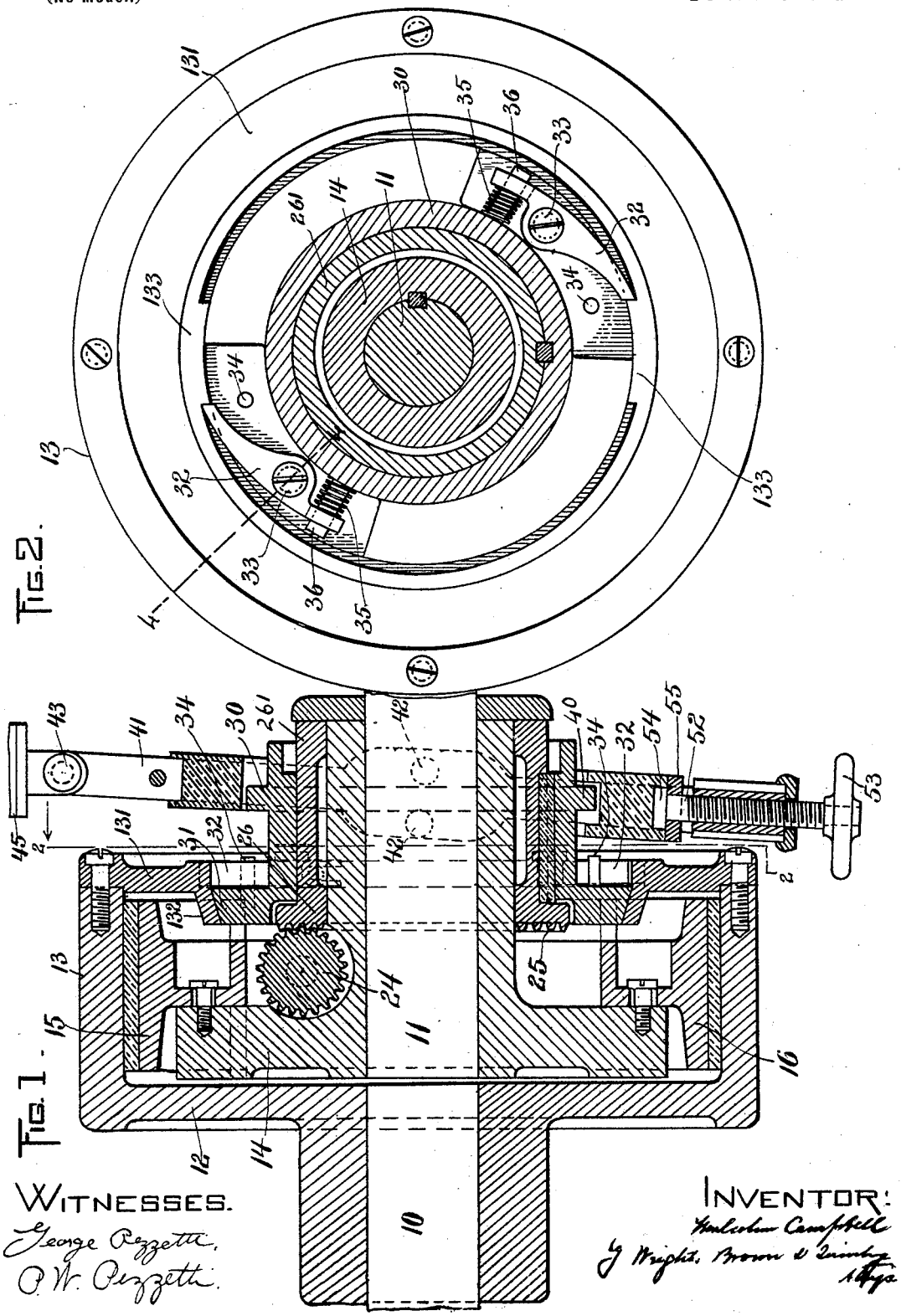
WITNESSES. INVENTOR:

No. 699,447. Patented May 6, 1902.
M. CAMPBELL.
FRICTION CLUTCH.
(Application filed Dec. 16, 1901.)
(No Model.) 2 Sheets—Sheet 2.
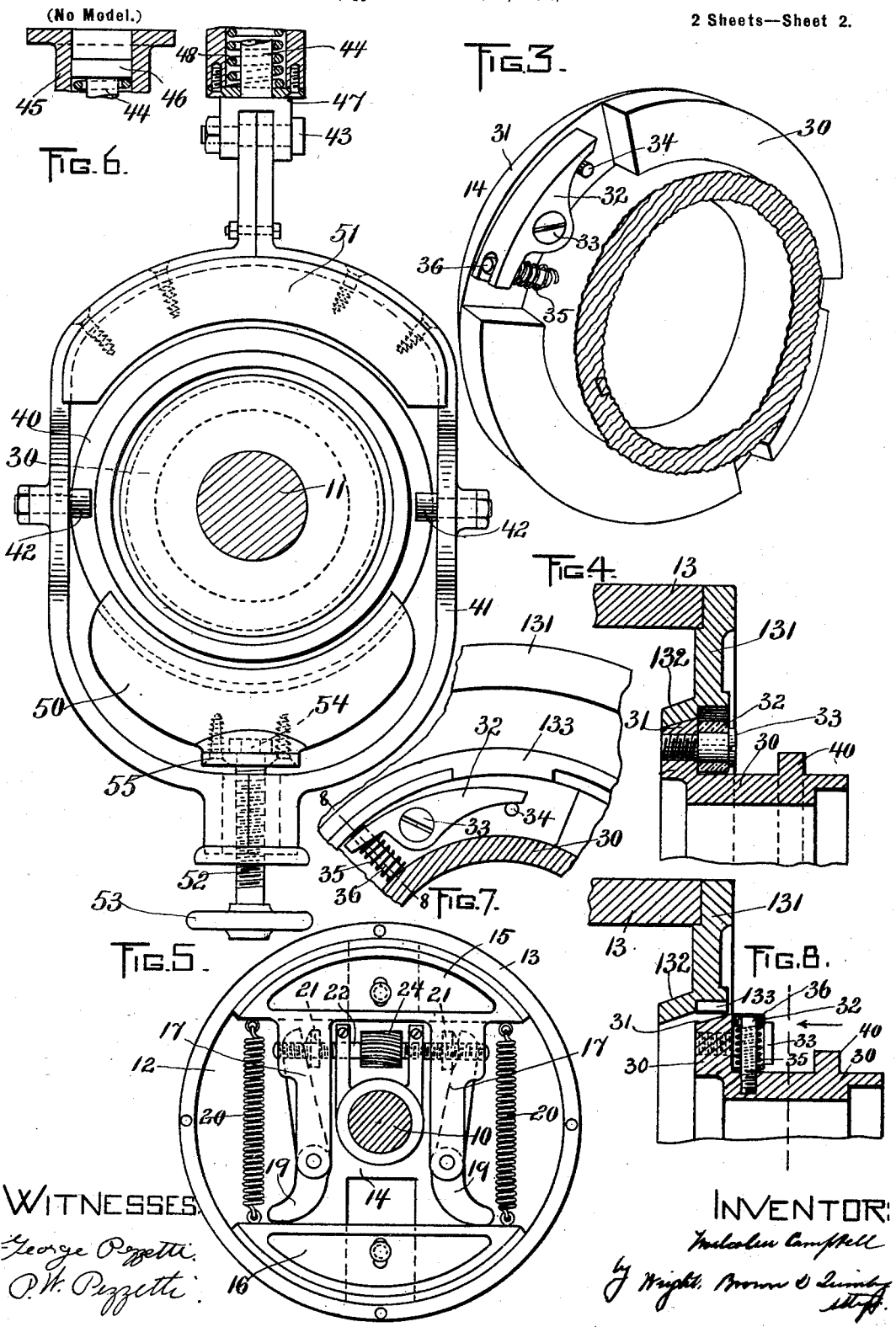

UNITED STATES PATENT OFFICE.

MALCOLM CAMPBELL, OF BOSTON, MASSACHUSETTS.

FRICTION-CLUTCH.

SPECIFICATION forming part of Letters Patent No. 699,447, dated May 6, 1902.

Application filed December 16, 1901. Serial No. 86,051. (No model.)

*To all whom it may concern:*

Be it known that I, MALCOLM CAMPBELL, of Boston, in the county of Suffolk and State of Massachusetts, have invented certain new and useful Improvements in Friction-Clutches, of which the following is a specification.

This invention has relation to friction-clutches of the general character of that set forth in my Letters Patent of the United States No. 686,923, granted November 19, 1901. The clutch set forth in said patent is provided with one clutching member having two oppositely-movable shoes to engage a friction-surface on the other member and a worm and worm-wheel for transmitting movement to said shoes to force them into operative position. The said clutch also provided mechanism for positively locking the worm to the rotating clutch member to cause its rotation and the consequent actuation of the oppositely-movable shoes. I have found it to be difficult in some cases to positively clutch the stationary worm-plate to the rotating clutch member when the latter is moving at a high rate of speed, and hence the object of the present invention is to provide means in a clutch of the character described for first frictionally engaging the worm-plate with the rotating clutch member and to thereafter positively engage it with said members when said plate has reached a fairly high speed, so as to lessen the shock incident to the positive engagement of the two parts.

Referring to the accompanying drawings, Figure 1 represents a longitudinal section through a clutch embodying the present improvements. Fig. 2 represents a section on the line 2 2 of Fig. 1. Fig. 3 represents in perspective view the centrifugally-acting dog or pawl and the part upon which it is mounted. Fig. 4 represents a section on the line 4 4 of Fig. 2. Fig. 5 represents, on a reduced scale, the oppositely-moving shoes and the mechanism actuated by the worm-plate, this view being taken with the worm-plate removed. Fig. 6 represents the shifting lever and the appliance for frictionally engaging the worm-plate to hold it against rotation to unclutch the movable shoes. Fig. 7 represents a detail of Fig. 2, showing one of the locking-pawls in the opposite or unlocked position. Fig. 8 is a section on line 8 8 of Fig. 7.

Referring to said drawings, the driving-shaft 10 and the driven shaft 11 are in axial alinement, as shown. To the shaft 10 is rigidly secured the rotating clutch member, illustrated as a wheel 12, with a flanged rim 13. To the said rim is rigidly secured an inwardly-projecting flange 131, having a beveled friction-surface 132. The said flange constitutes an internal ratchet, being provided with the diametrically opposite teeth 133. (See Fig. 2.) Within the rim of the wheel 12 is placed the clutch member 14, keyed to the shaft 11. This clutch member carries the separable shoes 15 16, whose outer edges are adapted to make contact with the inner surface of the rim 13. The shoe 15 has the arms 17 17, in which are fulcrumed two levers 19 19. The free ends of said levers bear against the shoe 16, their inner ends bearing against nuts 21 21 on a screw-shaft 22. The arms 17 and the levers 19 are formed and relatively arranged substantially as in the Patent No. 686,923, above referred to. Springs 20 20 connect the shoes 15 16, as shown. The screw-shaft 22 carries a worm-wheel 24, with which is engaged the worm in the form of a spiral scroll 25 on the scroll-plate 26. This scroll-plate is formed on the end of a sleeve 261 and is loosely mounted on the hub of the member 14. Keyed upon the hub or sleeve 261 of the worm there is a sliding member 30. This member is provided at one end with a flange 31, beveled complementally to the friction-surface 132 of the member 12. The said member 30 is therefore adapted to be moved into frictional engagement with the rotating clutch member 13, so as to frictionally drive the worm and cause it to rotate the worm-wheel, and thereby force the shoes 15 16 into frictional engagement with the interior surface of the rim 13 of the clutch member 12.

For the purpose of locking the sliding member 30 with the clutch member 12 I provide centrifugally-acting pawls or dogs, which are indicated at 32. These dogs are each fulcrumed at one end upon a stud 33, secured in the member 30, and they are normally held in an inoperative position, resting against a pin 34, by an expansion-spring 35, coiled about the guide-pin 36, passing loosely through the end of the pawl. Under normal conditions the springs 35 hold the pawls in inoperative position; but when the speed of the member 30 exceeds a certain number of revolutions per minute the longer ends of the dogs are thrown outward by centrifugal action and are caused to engage the ratchet-teeth 133 of the rotating clutch member 12, whereupon the said members 30 and 12 are positively clutched together and are rotated in unison. This positive clutching of the two members causes the positive rotation of the worm and the worm-wheel until the shafts 11 and 10 are so firmly clutched together as to move in unison. In order to unclutch the parts, it is merely necessary to disengage the member 30 from the rotating clutch member 12 and to apply friction to the said member 30. To accomplish this, I provide the following mechanism: On the hub of the said member 30 is a circumferential flange 40. A yoke 41 is formed with pins 42 42, which lie at either side of the said flange, as shown in Fig. 1. The upper end of the yoke is pivoted by a pintle 43 to a spindle 44, adapted to slide in a tubular guide 45, attached to some convenient stationary support. The spindle is formed on its end with a head 46, between which and a shoulder 47 on the guide there is placed an expansion helical spring 48. By reason of the jointed connection between the yoke and the spindle 44 the said yoke may be swung in the direction of the axis of the shaft 11 to move the member 30 into and out of operative position with respect to the member 12. The yoke is formed with two friction-shoes, (indicated, respectively, at 50 and 51,) being diametrically opposed to each other. The shoe 51 is rigidly secured to the top portion of the yoke, while the shoe 50 is mounted upon the end of a screw-bar 52, passed upward through a threaded portion in the yoke and formed with the handle 53, by which it may be rotated. The said screw-bar has a head 54, arranged in a socket in the shoe, and a disk 55, through which the screw-bar passes, is secured to the said friction-shoe 50. The said shoe is grooved, so as to take over the flange 40, so that when the screw-bar 52 is rotated the shoe 50 will be held against rotation.

The parts are so arranged and constructed that when the yoke is moved to disengage the member 30 from the member 12 the screw-bar 52 may be rotated to cause the friction-shoes 50 and 51 to frictionally engage the periphery of the flange 40 and hold the member 30, and thereby the worm 26, against rotation. The provision of the spring 48 enables the friction-shoes 50 and 51 to engage the flange 40 of the member 30, as will be readily understood.

Having thus explained the nature of the invention and described a way of constructing and using the same, although without attempting to set forth all of the forms in which it may be made or all of the modes of its use, I declare that what I claim is—

1. In a friction-clutch, a normally rotating clutch member having two friction-surfaces, a member having friction mechanism to engage one of said surfaces, a worm for actuating said mechanism, and a member in sliding engagement with said worm, and provided with means for frictionally engaging the other surface of the normally rotating clutch member, and with speed-controlled positive clutching means for engaging said normally rotating clutch member.

2. In a friction-clutch, a normally rotating clutch member having a friction-surface, a member having a complemental friction-surface to engage the first-mentioned friction-surface and having a movable positive clutching device operative by centrifugal action to positively engage the first-mentioned clutch member when the second-mentioned member reaches a predetermined speed of rotation, said normally rotating clutch member having means to be engaged by said positive clutching device.

3. In a clutch, a normally rotating clutch member having a friction-surface, and one or more ratchet-teeth, and a member adapted to frictionally engage the said friction-surface, said member being provided with a pawl operative by centrifugal action when the said second member reaches a predetermined speed of rotation to engage the tooth or teeth on the said normally rotating clutch member.

4. In a friction-clutch, a normally rotating clutch member having two friction-surfaces, a member having relatively movable friction-shoes to engage one of the friction-surfaces, means for actuating said shoes including a worm rotatable independently of the shoe-carrying member, and a third member rotatable with the second-mentioned member, but adapted to slide thereon, the said third member having means for frictionally engaging the first-mentioned member, and speed-controlled means for positively engaging the first-mentioned member.

5. In a friction-clutch, a normally rotating clutch member having a friction-surface, a second member having relatively movable friction-shoes to engage the friction-surface of the first-mentioned member, means for actuating said shoes, including a worm rotatable independently of the shoe-carrying member, a third member for connecting the worm to and disconnecting it from the first-mentioned normally rotating clutch member, and a yieldingly-mounted shifting lever having friction mechanism for retarding the rotation of the said third member, whereby the relative movement of said worm mechanism is reversed and the friction-surfaces separated.

6. In a friction-clutch, a normally rotating clutch member, a second member having friction mechanism for engaging the first-mentioned member, a third member for operating the friction mechanism, and means for retarding the rotation of the said third member for reversing the operation thereof, said retarding means including a yieldingly-mounted shifting lever, friction-shoes on said lever, and means for effecting the engagement of said shoes with said third member.

In testimony whereof I have affixed my signature in presence of two witnesses.

MALCOLM CAMPBELL.

Witnesses:
M. B. MAY,
C. C. STECHER.